United States Patent [19]

Lassiaz et al.

[11] Patent Number: 4,613,027
[45] Date of Patent: Sep. 23, 1986

[54] GRIPPING PIECE TO BE ATTACHED TO THE DIAPHRAGM OF A CLUTCH, AND AN ASSEMBLY UNIT CONSISTING OF SUCH A DIAPHRAGM AND SUCH A GRIPPING PIECE

[75] Inventors: Philippe Lassiaz, Boulogne; Bernard Mallet, Wittelsheim, both of France

[73] Assignee: Valeo, Paris, France

[21] Appl. No.: 598,684

[22] Filed: Apr. 10, 1984

[30] Foreign Application Priority Data

Apr. 11, 1983 [FR] France ................. 83 05850

[51] Int. Cl.⁴ .................. F16D 13/50; F16D 13/71
[52] U.S. Cl. ................... 192/89 B; 192/98; 192/110 B
[58] Field of Search .......... 192/98, 110 B, 89 B, 192/70.13

[56] References Cited

U.S. PATENT DOCUMENTS

| 2,630,897 | 3/1953 | Porter ................. 192/89 B |
| 3,963,105 | 6/1976 | Ernst et al. ........... 192/89 B X |
| 4,228,882 | 10/1980 | Lothar et al. ......... 192/98 |

FOREIGN PATENT DOCUMENTS

| 1803304 | 3/1970 | Fed. Rep. of Germany .... 192/89 B |
| 2327022 | 12/1974 | Fed. Rep. of Germany .... 192/89 B |
| 2639766 | 3/1978 | Fed. Rep. of Germany . |
| 2304826 | 10/1976 | France . |
| 2533651 | 3/1984 | France . |
| 1221761 | 2/1971 | United Kingdom . |

*Primary Examiner*—Rodney H. Bonck
*Assistant Examiner*—Alan G. Towner
*Attorney, Agent, or Firm*—Charles E. Brown; Charles A. Brown

[57] ABSTRACT

The gripping piece (16) used, which allows the clutch release bearing (10) to be coupled to the diaphragm (11), comprises, in one piece, an annular collar (16), by means of which it bears on the diaphragm (11), and retaining lugs (20) which pass axially through the diaphragm (11) and which, to retain it axially on the said diaphragm (11), each carry circumferentially, beyond the latter, a retaining finger (21).

According to the invention, the retaining finger (21) which a retaining lug (20) carries extends directly, starting from the axial end of such a retaining lug (20), so that the unit as a whole possesses only one bending elbow (42).

The invention is used, in particular, for diaphragm clutches of motor vehicles.

8 Claims, 5 Drawing Figures

GRIPPING PIECE TO BE ATTACHED TO THE DIAPHRAGM OF A CLUTCH, AND AN ASSEMBLY UNIT CONSISTING OF SUCH A DIAPHRAGM AND SUCH A GRIPPING PIECE

The present invention relates, in general terms, to diaphragm clutches, especially for motor vehicles, that is to say clutches in which the elastic means necessary for their engagement consist of an annular piece, called a diaphragm, comprising, in a single unit, a peripheral part forming a Belleville washer and a central part fragmented into radial fingers by means of slits.

To transfer to the disengagement configuration of such clutches, it is necessary to act on the end of the radial fingers of their diaphragm, and this action usually takes place by means of a member specifically designed for this purpose, commonly called a clutch release bearing.

The present invention is aimed, more particularly, at a case where such a clutch release bearing, then called a drawn bearing, must act by traction on the radial fingers of the diaphragm and must therefore be coupled to these for this purpose.

There has been a proposal to use, to this end, between the clutch release bearing and the diaphragm a piece, called a "gripping piece" or "active piece" here simply for the sake of convenience, which, separate from the clutch release bearing and suitably attached to the diaphragm, incorporates radially, on the side of the diaphragm opposite the clutch release bearing, a bearing collar by means of which it is designed to act on this diaphragm, one of the faces of this bearing collar, called a bearing face here for the sake of convenience, being designed to bear on the end of the radial fingers of the said diaphragm, in interaction with means of fixing in terms of traction, which, provided between the gripping piece and the clutch release bearing, are designed to make an axial connection between the said clutch release bearing and the said gripping piece in the axial direction going from the diaphragm to the clutch release bearing.

The advantage of such an arrangement, which is described, for example, in the French Patent filed on Mar. 19, 1975 under No. 75/08,514 and published under No. 2,304,826 and in the French Patent Application filed on Sept. 23, 1982 under No. 82/16,045, is, in particular, that it makes it possible to equip the diaphragm of the clutch to be controlled with the gripping piece in advance, even before the corresponding clutch mechanism is fitted, and subsequently to ensure, when the unit as a whole is assembled, that the clutch release bearing engages with the said gripping piece simply by being snapped in.

During such snapping-in, and to ensure that this is executed properly, it is, of course, advisable that the gripping piece should not be driven by the clutch release bearing, or in other words that it should remain engaged with the diaphragm.

In French Patent Application No. 82/16,045 mentioned above, it was proposed for this purpose to provide the gripping piece with lugs, called retaining lugs here for the sake of convenience, which, suitably distributed circularly, extend substantially axially and which each carry circumferentially and overhanging, parallel to the associated bearing collar, a finger, called a retaining finger here for the sake of convenience, which forms a retaining shoulder in the direction of the bearing face of the said bearing collar.

In practice, such retaining lugs form an integral part of the gripping piece which they equip, the assembly as a whole being obtained in one piece from one and the same initial metal blank as a result of the suitable cutting-out and shaping of the latter, especially by means of bending.

At all events, after it has been installed on the diaphragm which it is to equip, this being effected by means of a bayonet-type fitting implying temporary bending of the end of some of the radial fingers of this diaphragm, the gripping piece grips the latter permanently between its bearing collar and its retaining fingers.

With the exception of the assembly play, it is therefore incapable of being driven by the clutch release bearing when the latter is snapped in.

This arrangement is perfectly satisfactory.

However, the gripping pieces of the type in question which have been proposed hitherto are relatively complex and therefore costly to produce.

French Patent Application No. 82/16,045 proposes, in particular, a gripping piece, the retaining lugs of which are obtained from the bearing collar and comprise in succession, starting from the latter, a first portion extending substantially radially, a second portion extending substantially circumferentially in the plane of the preceding one and therefore substantially in the plane of the bearing collar, and a third portion extending substantially axially, the corresponding retaining finger being located at the end of this last portion.

The advantage of such a gripping piece is, in particular, that the third portion of its retaining lugs, namely that by means of which it passes axially through the diaphragm, is presented on edge and therefore with less thickness, thus allowing it, in fact, to pass through this diaphragm via the slits in the latter, without such slits being widened.

However, to produce it, it is necessary to make, for each retaining lug, two bending elbows, one between the second and third portions of such a retaining lug and the other between the said third portion and the retaining finger following it.

French Patent Application No. 82/16,045 also proposes, as an alternative, a gripping piece, the retaining lugs of which, no longer obtained from the bearing collar, but from a casing which this gripping piece possesses substantially axially in continuity with this bearing collar, extend substantially radially parallel to the said bearing collar, carrying the associated retaining finger directly at their end and in their plane.

The advantage of such a gripping piece is that, to produce its retaining lugs, only a single bending operation is required to form a bending elbow between each of the latter and the casing from which they are obtained.

However, to ensure that such bending is carried out properly, it is necessary to use, in addition to a bending die acting on the outside of the retaining lugs, a bending punch acting between these and the bearing collar, and, since this bending punch is to act transversely, that is to say perpendicularly to the axis of the unit as a whole, it is difficult to position it and retract it after bending; furthermore, it is liable to disturb its geometry in an inopportune way.

A difficulty of the same order arises as regards gripping pieces in which the retaining lugs, obtained from the bearing collar, have in succession two bending elbows, a first between the bearing collar and a first substantially axial portion of these retaining lugs, and a second between this substantially axial portion and a following portion, the latter extending substantially radially in the direction of the axis of the unit as a whole.

Although the first bending elbow merely requires, to produce it, a bending punch which, extending substantially axially, is easy to position and remove, the same is not true of the second which, to produce it, requires, as before, a bending punch which extends substantially transversely.

The subject of the present invention is, in general terms, an arrangement which makes it possible to avoid these disadvantages and which also leads to other advantages.

More specifically, its subject is, first of all, a gripping piece to be attached to the end of the fingers of the diaphragm of a clutch, of the type comprising, in one piece, an annular collar, called a bearing collar here for the sake of convenience, which extends substantially radially and which by means of one of its faces, called a bearing face here for the sake of convenience, is designed to bear on the end of the fingers of the diaphragm to be equipped, and at least two lugs, called retaining lugs here for the sake of convenience, which, obtained from the said bearing collar and suitably distributed circularly, extend substantially axially and which each carry circumferentially and overhanging, parallel to the bearing collar, a finger, called a retaining finger here for the sake of convenience, which forms a retaining shoulder in the direction of the bearing face on the said bearing collar, this gripping piece being characterized in that the retaining finger which a retaining lug carries extends directly, starting from the axial end of such a retaining lug, so that the unit as a whole possesses only one bending elbow; its subject is also an assembly unit for a clutch formed by a diaphragm and such a gripping piece attached to the latter.

Since the gripping piece according to the invention advantageously requires, to produce it, only a single bending operation to form a bending elbow between its bearing collar and the retaining lugs obtained from the latter, it is relatively easy and therefore economical to produce, and in particular such a production requires only a minimum number of operations.

Furthermore, the dimensions of its active parts are relatively easy to determine accurately.

This is true particularly of the axial distance separating the retaining shoulder of its retaining fingers from the bearing face of its bearing collar.

In fact, this axial distance depends, on the one hand, on an accurate cut-out and, on the other hand, on a bending operation which, since it is the only one and requires to carry it out only one axially arranged bending punch which is easy to remove without the unit as a whole being deformed inopportunely, can likewise be executed accurately.

This is also true of the diameter of the circumference along which these retaining lugs extend.

In fact, this depends only on the single bending operation carried out, which, as emphasized above, can be executed accurately.

Since the dimensions of the active parts of the gripping piece according to the invention are determined exactly in this way, it is advantageously possible to make do with greatly reduced assembly plays, this being conducive both to obtaining good working conditions for the means of fixing in terms of traction, to be used between such a gripping piece and the associated clutch release bearing, and therefore to a secure fixing in terms of traction, as desired, and to obtaining a minimum axial and diametral bulk for the unit as a whole, and consequently the extent of the frustoconical engagement bearing surfaces to be used so as to allow these means of fixing in terms of traction to take effect when the clutch release bearing is snapped onto the gripping piece can advantageously be reduced.

Moreover, the characteristics and advantages of the invention will emerge from the following description given by way of example, with reference to the attached diagrammatic drawings in which.

Figure 1:
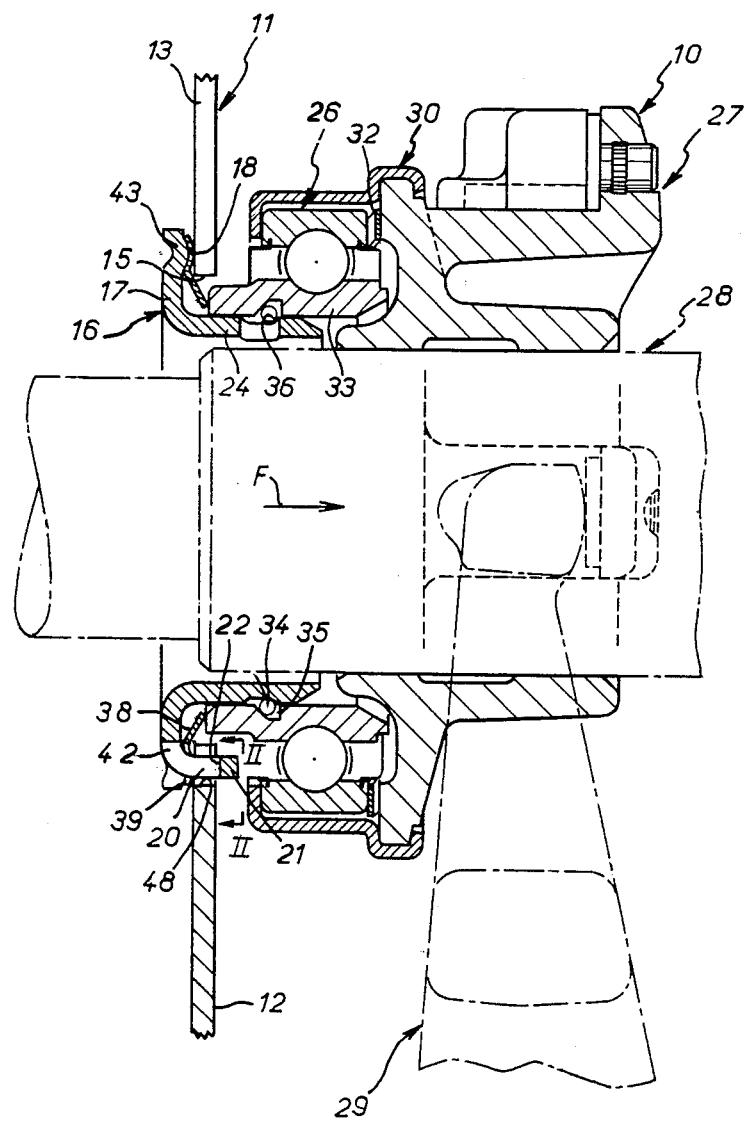
FIG. 1 is a view in axial section of an assembly of a clutch release bearing utilizing a gripping piece according to the invention.

As illustrated in FIG. 1, a clutch release bearing 10 is to be coupled to the diaphragm 11 of any diaphragm clutch.

As is known, such a diaphragm 11 consists of an annular piece comprising, in a single unit, a peripheral part forming a Belleville washer and a central part fragmented into radial fingers 12 by means of slits 13.

Figure 2:
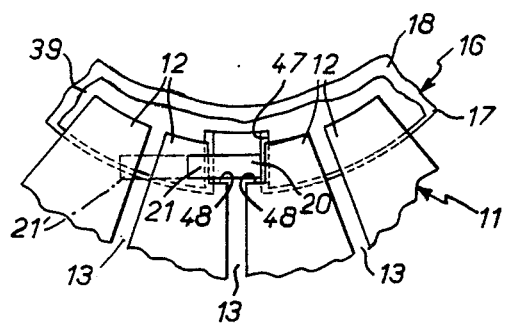
FIG. 2 is a partial elevation view of this assembly along the line II—II of FIG. 1.

FIGS. 1 and 2 only show the end of these radial fingers 12, this end forming the only part of the diaphragm 11 with which the present invention is concerned.

To couple the clutch release bearing 10 to the diaphragm 11, necessary for this clutch release bearing 10 to act by traction on this diaphragm 11, a piece 16, called a gripping piece here for the sake of convenience, is attached to the latter by means of the central orifice 15 which it incorporates.

Such a gripping piece comprises, in a single unit, on the one hand an annular collar 17, called a bearing collar here for the sake of convenience, which extends substantially radially and which by means of one of its faces, its face 18 turned towards the clutch release bearing 10 and called a bearing face here for the sake of convenience, is designed to bear on the end of the fingers 12 of the diaphragm 11, and on the other hand at least two lugs 20, called retaining lugs here for the sake of convenience, which, obtained from the said bearing collar 17 and suitably distributed circularly, extend substantially axially and each carry circumferentially and overhanging, parallel to the bearing collar 17, a finger 21, called a retaining finger here for the sake of convenience, which forms a retaining shoulder 22 in the direction of the bearing face 18 of the said bearing collar 17 and parallel to this.

Moreover, in the embodiments illustrated, the gripping piece 16 possesses, in one piece, starting from the inner periphery of its bearing collar 17 and in the direction of the clutch release bearing 10, a casing 24 which extends substantially axially and by means of which it passes through the diaphragm 11 via the central orifice 15 in the latter at a distance from the edge of the said orifice.

Since the clutch release bearing 10 does not form part of the present invention and is well known per se, it will not be described in detail here.

It will suffice to mention that it comprises an engagement element 26, via which it is designed to act on the diaphragm 11 by means of the gripping piece 16, as described in detail below, an actuating element 27, by means of which it is intended to be mounted so as to slide axially on any guide member 28 in the embodiments illustrated and by means of which it is designed, moreover, to be actuated by a control member 29, for example a clutch release bearing, as indicated by broken lines in FIG. 1, and coupling means which secure the said engagement element 26 axially to the said actuating element 27 and which consist, for example, as illustrated, of an annular casing 30 suitably crimped on these at its ends.

Since the embodiments illustrated relate to a self-centered clutch release bearing with self-centering being maintained, a corrugated elastic washer 32 is interposed axially between the engagement element 26 and the actuating element 27, and an annular play is left free between this engagement element 26 and the casing 30 which couples it axially to the actuating element 27.

In the embodiments illustrated, the engagement element 26 consists of a ball-bearing, the inner race of which constitutes the engagement piece 33 of the clutch release bearing 10, that is to say the piece of this clutch release bearing via which the latter is designed to act by means of the gripping piece 16 on the diaphragm 11, and via this engagement piece 33 the said clutch release bearing 10 is engaged axially on the axial casing 24 of the said gripping piece 16.

Between the engagement piece 33 of the clutch release bearing 10 and the gripping piece 16 and, more specifically, between this engagement piece 33 and the axial casing 24 of the said gripping piece 16 there are snap-in means which allow the clutch release bearing 10 to be fixed in terms of traction on the gripping piece 16 in the axial direction which, identified by the arrow F in FIG. 1, goes from the diaphragm 11 to the clutch release bearing 10.

In practice, these snap-in means comprise, on the one hand, a fixing ring 34, which is at least partially engaged radially in a retaining groove 35 provided for it in the engagement piece 33, and, on the other hand, a driving bearing surface 36 which is provided substantially transversely on the casing 24 of the gripping piece 16 and with which the said fixing ring 34 interacts axially as an abutment in the axial direction in question.

Since these arrangements do not form part of the present invention, they will not be described in any more detail here.

In a way known per se, the fixing ring 34 has associated with it elastic means designed to ensure that it is stressed in the direction of the driving bearing surface 36.

In the embodiments illustrated, these elastic means consist of a washer 38 which takes effect axially between, on the one hand, the bearing collar 17 of the gripping piece 16 and, on the other hand, the end of the engagement piece 33 of the clutch release bearing 10 and which, according to an arrangement not forming part of the present invention, is on its outer periphery, to retain it axially, integral with an annular collar 39 inserted axially between the said bearing collar 17 of the gripping piece 16 and the diaphragm 11.

Consequently, in the embodiment illustrated, the gripping piece 16 bears by means of its bearing collar 17 on the diaphragm 11 indirectly via this collar 39.

However, it goes without saying that, alternatively, with other arrangements being made for the elastic means associated with the fixing ring 34, the gripping piece 16 can bear on the diaphragm 11 directly by means of its bearing collar 17.

At all events, for the purpose of such a bearing action, the bearing collar 17 preferably forms an annular bead 43, as illustrated.

In the embodiment illustrated more particularly in FIGS. 1 to 4, the retaining lugs 20 which the gripping piece 16 possesses are obtained from the central part of the bearing collar 17 of the latter, being separated laterally from the peripheral part of this bearing collar 17 by means of notches 40 which, resulting from simple shear cuts, can, for example, have continuous edges, as illustrated, or which, on the contrary, resulting from a cutting-out operation, can have their edges apart from one another.

According to the invention, the retaining finger 21 which such a retaining lug 20 carries extends directly, starting from the axial end of this retaining lug 20, so that for such a retaining lug 20 the assembly consisting of the bearing collar 17, retaining lug 20 and retaining finger 21 possesses only one bending elbow 42.

In practice, this is a bending elbow by means of which the retaining lug 20 is connected to the bearing collar 17.

In other words, according to the invention, the retaining finger 21 which a retaining lug 20 carries is located radially, relative to the axis of the unit as a whole, at the same level as this retaining lug 20.

In the embodiment illustrated more particularly in FIGS. 1 to 4, such a retaining finger 21 is substantially at the same level radially as the circumference along which the gripping piece 16 bears on the diaphragm 11 by means of its bearing collar 17 or, in other words, as the circumference along which the corresponding annular bead 43 of the said bearing collar 17 extends.

In practice, at least two retaining lugs 20 are provided.

Preferably, there are three retaining lugs 20 uniformly distributed circularly about the axis of the unit as a whole.

In all cases, the retaining fingers 21 carried by these retaining lugs 20 all extend circumferentially in the same direction.

As is easy to understand, the gripping piece 16 according to the invention can advantageously be obtained in one piece from one and the same initial blank, in practice a metal blank, as a result of suitable cutting-out and shaping of the latter.

Thus, the bearing collar 17 and the casing 24 of this gripping piece 16 can be formed by cutting out and stamping such a blank.

This stamping is utilized to profile the bearing collar 17 as a consequence, forming annularly on it the bead 43 allowing it to bear on the diaphragm 11, the collar 39 of the elastic washer 38 interposed between it and this diaphragm 11 being jointly profiled in a complementary manner.

Figure 3:
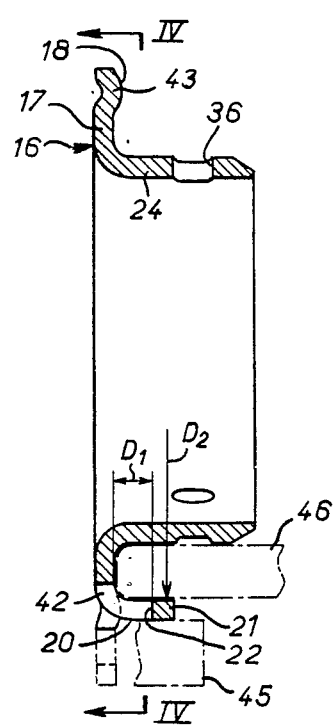
FIG. 3 is a view in axial section of the gripping piece according to the invention only, shown in isolation in axial section along the broken line III—III of FIG. 4.
Figure 4:
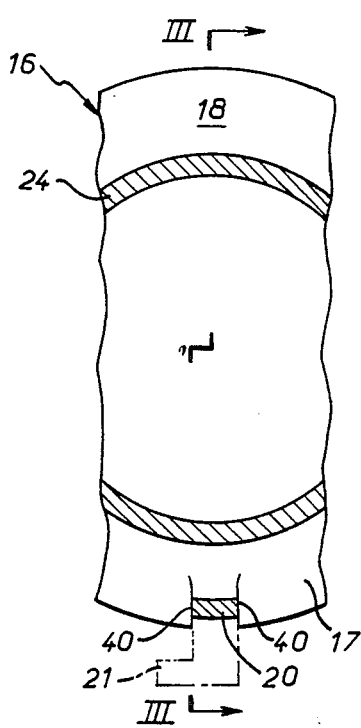
FIG. 4 is a partial cross-sectional view of this gripping piece along the line IV—IV of FIG. 3.

When the bearing collar 17 is cut out, the retaining lugs 20 are jointly cut out on the periphery of the latter, as indicated by broken lines in FIGS. 3 and 4, and, like the bearing collar 17, extend in the plane of the initial blank.

For the final shaping of the gripping piece 16, it is therefore sufficient, subsequently, to bend the retaining lugs 20 substantially at right-angles, but with a wide rounding forming the corresponding bending elbow 42.

As indicated by broken lines in FIG. 3, such bending can advantageously be carried out, on the one hand, by means of a bending die 45 acting on the outside of the retaining lugs 20 and, on the other hand, by means of a bending punch 46 which, acting on the inside, is inserted axially between the said retaining lugs 20 and the associated axial casing 24.

Since this bending punch 46 takes effect axially, it is easy to position and remove, without resulting, during removal, in any disturbance of the previously executed bending and therefore of the geometry of the unit as a whole.

Consequently, the axial distance D1 separating the retaining shoulder 22 of the retaining fingers 21 from the bearing face 18 of the bearing collar 17 can be strictly maintained, and the same is true of the diameter D2 of the circumference along which these retaining fingers 21 extend.

As will be noted, a result of the abovedescribed process is that, according to a characteristic of the invention, the retaining shoulder 22 formed by a retaining finger 21 of the gripping piece 16 according to the invention is constituted by the edge of the blank from which this gripping piece 16 is taken.

In the embodiment illustrated in FIGS. 1 to 4, such a retaining finger 21 is rectilinear in the plane of the corresponding retaining lug 20.

However, it goes with saying that it could also be curved, with the radius of the circumference on which the said retaining lug 20 is located.

It is consequently sufficient to shape the bending die and punch.

The radial "level" of a retaining finger 21, which was mentioned above, is therefore of course determined in line with the zone in which it is established on the retaining lug 20, irrespective of its own particular configuration.

In practice, for each of the retaining lugs 20 of the gripping piece 16, the collar 39 of the elastic washer 38 has locally, for the passage of such a lug, a recess 47, FIG. 2, and, in conjunction with this, each of the fingers 12 of the diaphragm 11 also affected by such a retaining lug 20, has one opposite the other, for the passage of the latter, a groove 48, one portion of which is substantially parallel to the corresponding slit 13 in the diaphragm 11, while the other is substantially tangent to a circumference of the unit as a whole.

Of course, the axial distance D1 mentioned specifically above is made sufficient to ensure that the gripping piece 16 can grip, between its bearing collar 17 and its retaining fingers 21, both the diaphragm 11 and, in the embodiment illustrated, the collar 39 of the elastic washer 38.

The gripping piece 16 according to the invention is installed on the diaphragm 11 according to a bayonet fitting of the type described in French Patent Application No. 82/16,045 mentioned above; after the diaphragm 11 and the gripping piece 16 have been brought sufficiently close to one another, the end of each of the fingers 12 of the diaphragm 11, on which the retaining finger 21 of the retaining lugs 20 of the gripping piece 16 must engage circumferentially, is bent axially relative to the others, and then the said gripping piece 16 is rotated circumferentially about the axis of the unit as a whole relative to the said diaphragm 11, to ensure that such engagement had in fact occurred, and the previously bent fingers of the diaphragm 11 are subsequently released.

At the end of such an installation, each of the retaining lugs 20 of the gripping piece 16 passes axially through the diaphragm 11 between two adjacent fingers 12 of the latter by means of grooves 48 provided for this purpose in these two fingers 12, and via its retaining finger 21 it is engaged circumferentially on one of these fingers 12.

Of course, in the embodiment illustrated in FIGS. 1 to 4, such an installation involves at the same time the elastic washer 38 which is engaged beforehand by means of its recesses 47 in the fingers 21 of the gripping piece 16.

At all events, the gripping piece 16 according to the invention, gripping the diaphragm axially between the bearing face 18 of its bearing collar 17 and the retaining shoulder 22 of each of its retaining fingers 21, is secured axially to the diaphragm 11 in both directions, without being able to escape accidentally from the latter.

Moreover, its retaining lugs 20 pass radially through the diaphragm 11 with a limited play, and this play corresponds at least substantially to the selfcentering play of the associated clutch release bearing 10.

However, in spite of this play which is relatively slight, it is accurately centered radially in relation to the diaphragm 11 by means of the portions of the grooves 48 of the relevant fingers 12 of the latter which are substantially tangent to a circumference of the unit as a whole, this being, in practice, that on which its retaining lugs 20 are located.

Consequently, the axial engagement of the engagement piece 33 of the clutch release bearing 10 in its axial casing 24 takes place very easily.

As illustrated by unbroken lines in FIG. 2, each of the retaining fingers 21 of the gripping piece 16 affects only one of the fingers 12 of the diaphragm 11; alternatively, as indicated by broken lines 21' in this FIG. 2, it can be sufficiently extended circumferentially to affect two fingers 12 of the diaphragm 11, especially when these themselves have only a limited circumferential extension in line with such retaining fingers 21.

Figure 5:
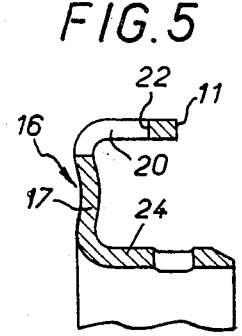
FIG. 5 is a partial view in axial section similar to that of FIG. 3 and relating to an alternative embodiment.

According to the alternative embodiment illustrated in FIG. 5, the retaining lugs 20 of the gripping piece 16 extend on the periphery of the bearing collar 17 of the latter, so that its retaining fingers 21, which remain radially at the same level as the said retaining lugs 20, are in this case located at a radial level higher than that of the circumference along which the said bearing collar 17 bears on the diaphragm 11.

At all events, and as will be noted, the retaining shoulder 22 of the fingers 21 of the gripping piece 16 and the bearing collar 17 of the latter are arranged on one and the same side of the diaphragm 11.

Of course, the present invention is not limited to the embodiments described and illustrated, but embraces any alternative forms of execution.

We claim:

1. A gripping piece for attaching a pull type clutch release bearing to radially inner ends of fingers of a clutch diaphragm spring, said gripping piece being of onepiece sheet metal construction and comprising means for coupling the pull type clutch release bearing thereto, a radial annular bearing collar having a bearing face cooperable with the radially inner ends of the diaphragm spring fingers for operating the diaphragm spring in traction at least two circumferentially spaced axially extending retaining lugs adapted to be received between adjacent pairs of radial fingers of the diaphragm spring, retaining fingers, at a free end of the respective retaining lugs, circumferentially extending in the same circumferential direction and in circumferential alignment with their associated retaining lugs, said retaining fingers defining retaining shoulders axially spaced from and on the opposite side of the diaphragm spring from said bearing collar, each of said retaining lugs having a single bend, the single bend extending circumferentaily and being located at a junction of said bearing collar and the associated retaining lug, and the gripping piece thus defines bayonet mounting means for attachment to the fingers of the diaphragm spring by temporary deflection of selected one of the adjacent pairs of diaphragm spring fingers.

2. A gripping piece as claimed in claim 1, wherein the bearing face has bearing zones located at a predetermined radial distance from the axis of the gripping piece, and said bearing fingers being located at substantially the same radial distance as said bearing zones.

3. A gripping piece as claimed in claim 1, wherein said retaining fingers are substantially coplanar with their respective retaining lugs.

4. A gripping piece as claimed in claim 1, wherein said retaining fingers have substantially the same circumferential curvature as their respective retaining lugs.

5. A gripping piece as claimed in claim 1, wherein said bearing face has bearing zones located at a predetermined radial distance from the axis of the gripping piece, and said retaining fingers being at a greater radial distance from axis of the gripping piece than said bearing zones.

6. A gripping piece as claimed in claim 1, wherein said retaining shoulders are defined by cutout zones in a blank from which the gripping piece is formed.

7. A clutch diaphragm spring assembly comprising a clutch diaphragm spring including a Belleville washer peripheral portion and a central portion having radial fingers separated by radial slots, and a gripping piece for attaching a pull type clutch release bearing to radially inner ends of the fingers of said clutch diaphragm spring, said gripping piece being of one-piece sheet metal construction and comprising means for coupling the pull type clutch release bearing thereto, a radial annular bearing collar having a bearing face cooperable with the radially inner ends of said diaphragm spring fingers for operating said diaphragm spring in traction, at least two circumferentially spaced axially extending retaining lugs adapted to be received between adjacent pairs of radial fingers of said diaphragm spring, retaining fingers at a free end of the respective retaining lugs, circumferentially extending in the same circumferential direction and in circumferential alignment with their associated retaining lugs, said retaining fingers defining retaining shoulders axially spaced from and on the opposite side of said diaphragm spring from said bearing collar, each of said retaining lugs having a single bend, the single bend extending circumferentially and being located at a junction of said bearing collar and the associated retaining lug, and said gripping piece thus defining bayonet mounting means for attachment to said fingers of said diaphragm spring by temporary deflection of selected ones of the adjacent pairs of said diaphragm spring fingers.

8. A diaphragm spring assembly as claimed in claim 7, wherein said pairs of adjacent diaphragm spring fingers have cutouts communicating with the associated slot therebetween for receiving the respective retaining lugs.

* * * * *